United States Patent
Parlante

[11] Patent Number: 6,035,699
[45] Date of Patent: Mar. 14, 2000

[54] WATER LEAKAGE DETECTION APPARATUS

[76] Inventor: Nicholas Parlante, 36 Broadway, Dobbs Ferry, N.Y. 10522

[21] Appl. No.: 09/071,116

[22] Filed: May 1, 1998

[51] Int. Cl.[7] .................................................. G08B 21/00
[52] U.S. Cl. ................................ 73/40; 73/49.2; 340/605; 340/623
[58] Field of Search ........................ 73/40, 49.2; 340/605, 340/623

[56] References Cited

U.S. PATENT DOCUMENTS

| | | | |
|---|---|---|---|
| 3,473,553 | 10/1969 | Collins | 137/312 |
| 3,874,403 | 4/1975 | Fischer et al. | 340/605 X |
| 4,814,752 | 3/1989 | Lehman | 340/623 X |
| 5,229,750 | 7/1993 | Welch, Jr. et al. | 340/605 |
| 5,345,224 | 9/1994 | Brown | 340/605 |
| 5,357,241 | 10/1994 | Welch, Jr. et al. | 340/605 |
| 5,632,302 | 5/1997 | Lenoir, Jr. | 340/605 X |
| 5,857,482 | 1/1999 | Dowling | 340/605 X |
| 5,870,024 | 2/1999 | Arvelo, Jr. | 340/605 |
| 5,877,689 | 3/1999 | D'Amico | 340/605 |

FOREIGN PATENT DOCUMENTS

| | | | |
|---|---|---|---|
| 222174 | 5/1987 | European Pat. Off. | 340/605 |

*Primary Examiner*—Daniel S. Larkin
*Attorney, Agent, or Firm*—Eugene Lieberstein; Michael N. Meller

[57] ABSTRACT

Apparatus for detecting a discharge of water such as a leak in a device containing a relatively large volume of water such as a hot water storage tank having a pressure relief valve and for shutting off the water supply to such device in response to such detection. The apparatus includes a relatively shallow pan located in proximity to the bottom of the device for collecting water discharged from the device either from a leak or from opening of the pressure relief valve, a float switch mounted in the pan for detecting the presence of water in the pan above a predetermined level and a shut off control valve for disabling the water supply to the device upon activation of the float switch.

1 Claim, 1 Drawing Sheet

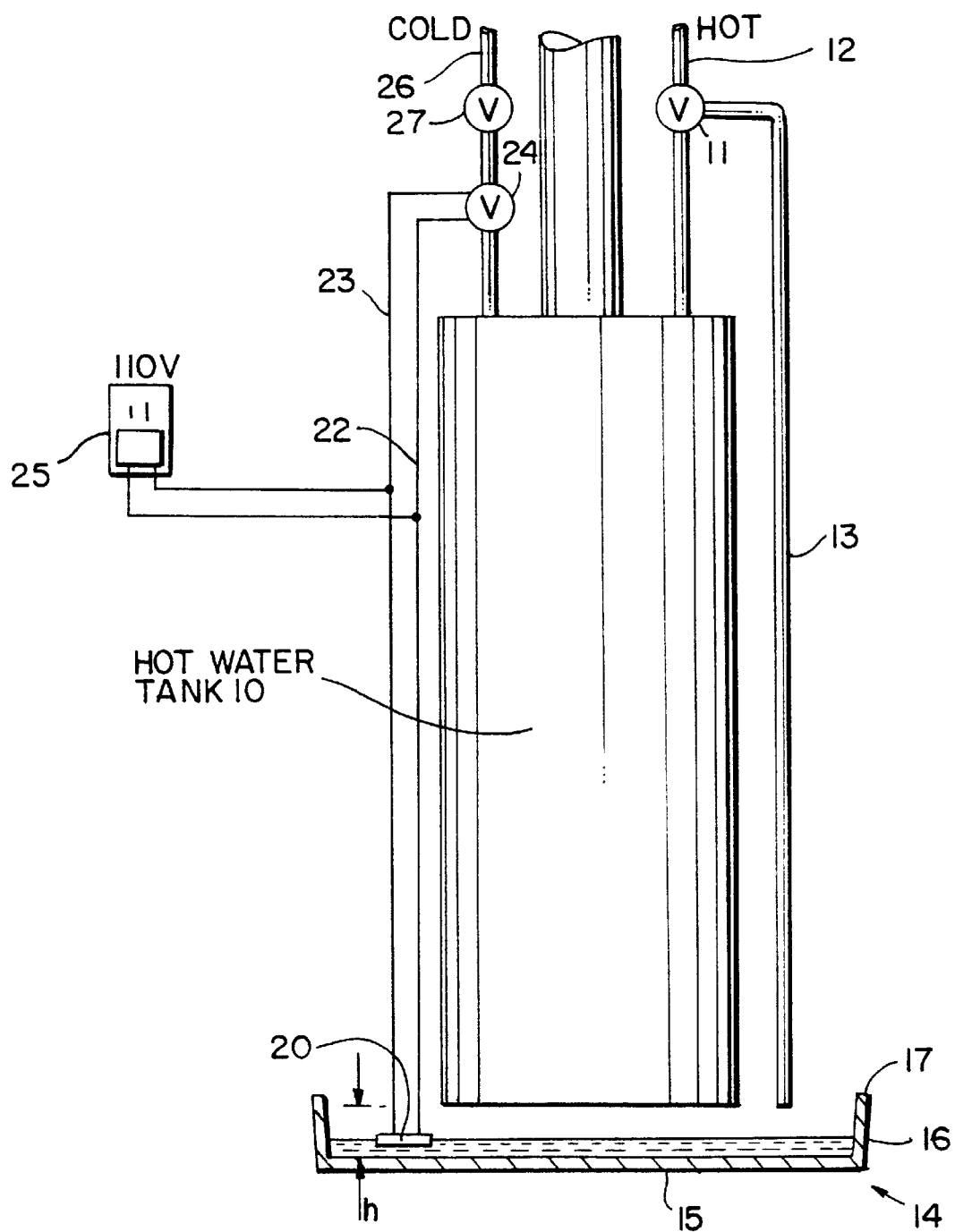

WATER LEAKAGE DETECTION APPARATUS

FIELD OF INVENTION

This invention relates to apparatus for detecting a water leak in a device containing a relatively large volume of water, such as a water storage tank or a washing machine, and for shutting off the water supply to such device in response to such detection.

BACKGROUND OF THE INVENTION

In residential homes and commercial buildings, hot water is supplied from a water storage tank which stores a relatively large quantity of water. The size of the water storage tank is commensurate with the size of the home or building in which it is placed. Even small residential homes will have a water storage tank containing at least 20 or more gallons of water. Because the water storage tank operates under pressure once a leak develops, it takes only a relatively short time period for a substantial volume of water to escape from the tank into the surrounding area of the residential home or building. This can result in substantial flooding and damage particularly in those instances where the water storage tank or appliance is not located near a floor drain or is located on a floor above ground level.

Eventually, all water storage tanks leak. This is primarily the result of corrosion in the substructure of the tank or through the tank wall from minerals present in hard water. Corrosion on the inside of the tank is not visible outside the tank until the tank leaks at which time it is, in general, too late to take corrective action unless the leak is immediately located and proper action taken to close the water valves to the tank.

SUMMARY OF THE INVENTION

The apparatus of the present invention operates to detect the presence of a water leak in a device, such as a water storage tank, and to shut off the water intake valve to the device in response to the detection of the leak. Optionally, the apparatus of the present invention may also set off an alarm or a visual indicator to provide awareness of the presence of the leak so that corrective measures may be taken.

The apparatus of the present invention comprises a relatively shallow container for mounting the water storage device, means for detecting the presence of water in said container when the level of water rises above a predetermined amount and control means for disabling the water supply to said device and to interrupt the operation of said device upon activation of such means.

BRIEF DESCRIPTION OF THE DRAWINGS

Other advantages of the present invention will become apparent from the following detailed description of the invention when read in conjunction with the accompanying drawing which is a diagrammatic view of the apparatus of the present invention for use in conjunction with a water tank.

DETAILED DESCRIPTION OF THE INVENTION

T he present invention as illustrated in the single figure comprises a hot water storage tank 10 which is a commercially available product. The hot water tank 10 is shown mounted over a relatively shallow container or pan 14 so that any water leaking from the tank 10 or machine 12 will necessarily accumulate in the pan 14. It should be understood that the pan 14 can be formed as an integral part of the hot water tank 10 using, for example, the bottom of the tank 10 as a common base for the bottom of the pan 14. The hot water tank 10 includes a conventional pressure relief valve 11 which detects the internal pressure within the tank 10 so that if the pressure exceeds a predetermined level, the pressure relief valve 11 opens. The pressure relief valve 11 is connected to the hot water line 12 exiting from the hot water tank 10. An additional conduit 13 has one end connected to the hot water line 12 through the pressure relief valve 11 and has an open opposite end 17 located directly above the pan 14 so that the pan 14 will also collect any hot water discharged from the tank 10 through conduit 13 if the pressure relief valve 11 opens.

The pan 14 comprises a base 15 of any geometry and a lid 16 vertically extending therefrom. The lid 16 will accommodate a small volume of water leaking from the tank 10 before overflowing. The base 15 of the pan 14 can also be of any geometry, although it should sized so that it is larger than the counterpart cross sectional dimension of the water storage tank 10. Accordingly, If the storage tank is circular the pan 14 in cross section should have a length greater than the diameter of the tank 10. The apparatus of the present invention is equally applicable to any other device storing a relatively large volume of water which is susceptible of leaking, such as a washing machine. The pan 14 in this case can be placed below the washing machine. When the pan 14 is placed underneath a washing machine, it should preferably be positioned close enough to the hose inlets to the washing machine so that, if the hose springs a leak, water will accumulate in the pan 14.

The vertical height "h" of the lid 16 is not particularly significant as long as it allows for sufficient accumulation of water from a leak in the tank 10. Detection of water in the pan can be accomplished electromechanically or optically. The preferred method of detection uses a conventional mechanical float switch 20 which is mounted or affixed to the pan 14 so that as the level of water in the pan rises to a predetermined level the float switch will be activated. The level at which the float switch is activated is manually adjustable. Preferably, it should be set at a level to avoid false activation from the accumulation of water in the pan 14 over time, such as from, e.g. condensation, but is not due to a leak in the tank 10.

The float switch 20 is connected in an electrical circuit through electrical wiring 22 to a source of AC or DC power across the output of a 24 or 12 volt transformer 25 which, in turn, is connected to the 110 or 120 volt line supply in the building housing the water storage tank. Alternatively, a separate source of power may be used. The float switch 20 is also connected through electrical wiring 23 to an electric shut off valve 24. An electric shut off valve 24 is a conventional commercially available device. In the arrangement as shown in the single figure, the shut off valve is placed in the cold water intake line 26 to the hot water storage tank 10 and is connected in line with the circuit connecting the float switch 20 to the transformer 25 so that the valve 24 will switch from its normally "on" position to its "off" position in response to closing of the float switch 20. The float switch 20 closes when the float 20 rises above or exceeds the preadjusted float switch position designating the existence of a leak in the storage tank 10. When the valve 24 is in the "on" position, it is open to permit water to flow under pressure directly from the cold water line into the storage tank 10. A separate manual valve 27 may also be placed in line with the electric valve 24 to manually open or close the cold water line to the water storage tank 10.

Many alternative water detection devices may be used in place of the float switch 20, such as for example, using an optical sensor, such as a conventional LED assembly, which may be arranged to be activated when water accumulates to a level in the pan 14 to interrupt a light beam or to change the light reflection signal. In this arrangement the LED would be in a circuit with an electrical relay. The relay contacts would be placed in circuit between the transformer 25 and the electric shut off valve 24 to activate the electric shut off valve 24 as explained above upon the presence of a water leak. Another alternative would be to employ two metal plates as a capacitor in an electrical circuit which would be activated upon changing the capacitance due to the presence of water in the pan 14.

The hot water tank 14 can be an electrically fired tank, a gas fired tank, or an oil fired rank. In the case of an electrically fired tank, the float switch 20 may also be used to disconnect the supply of electrical power to the hot water tank.

In addition to the control of the supply of water to the tank 14, an alarm (not shown) and/or a visual indicator, such as a light, may also be placed in circuit through a relay contact (not shown) with the wiring between the float switch 20 and the transformer 25 to activate the alarm and/or light when the float switch is activated.

What I claim is:

1. Apparatus for detecting a discharge of water such as a leak from a device containing a relatively large volume of water with said device being connected to a cold water supply line and to a hot water line and having a pressure release valve connected to said hot water line for discharging hot water from said device when the internal pressure of said device exceeds a predetermined pressure; said apparatus comprising a relatively shallow pan located in close proximity to the bottom of said device for collecting water being discharged from said device, a conduit connecting said hot water line from said pressure release valve into said pan such that upon the opening of said pressure release valve hot water flows into said pan from said device, float switch means mounted in said pan with said float switch means having a closed and open switch position and being positioned in said pan so that said float switch means switches from said open position to said closed position when water collects in said pan above a predetermined level and once in said closed position remains in said closed position even if the water level recedes to below said predetermined level, an electric shut off valve connected to the cold water line and to said float switch means for disabling the cold water supply line to said device when said float switch means switches from said open position to said closed position and wherein said float switch means and said electric shut off valve are electrically connected to one another through an AC transformer and to a source of AC power such that said electric shut off valve is operated from reduced AC voltage supplied from said transformer.

* * * * *